P. ROSA.
AEROPLANE SHOCK ABSORBER.
APPLICATION FILED APR. 25, 1918.
1,277,260.
Patented Aug. 27, 1918.
2 SHEETS—SHEET 2.
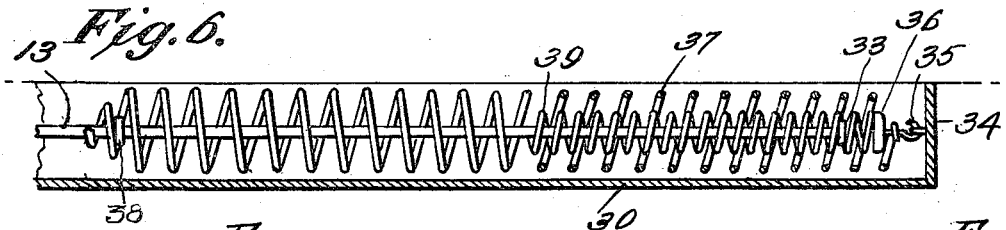
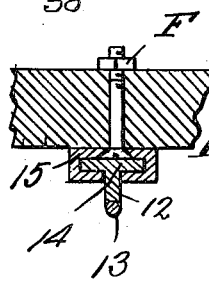
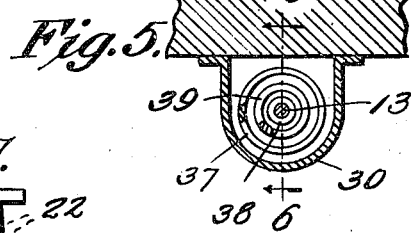
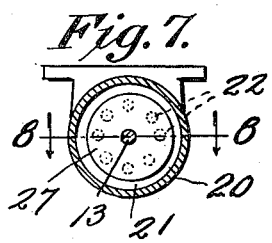
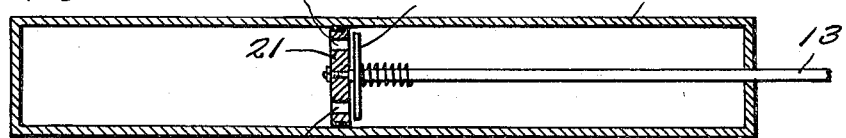
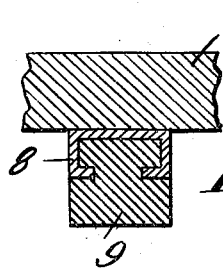
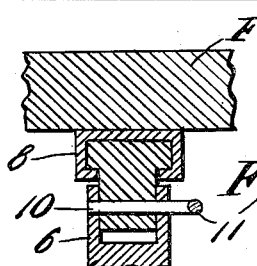
INVENTOR
Peter Rosa,
WITNESSES
James F. Crown,
N. Collamer
BY Richard Owen,
ATTORNEY

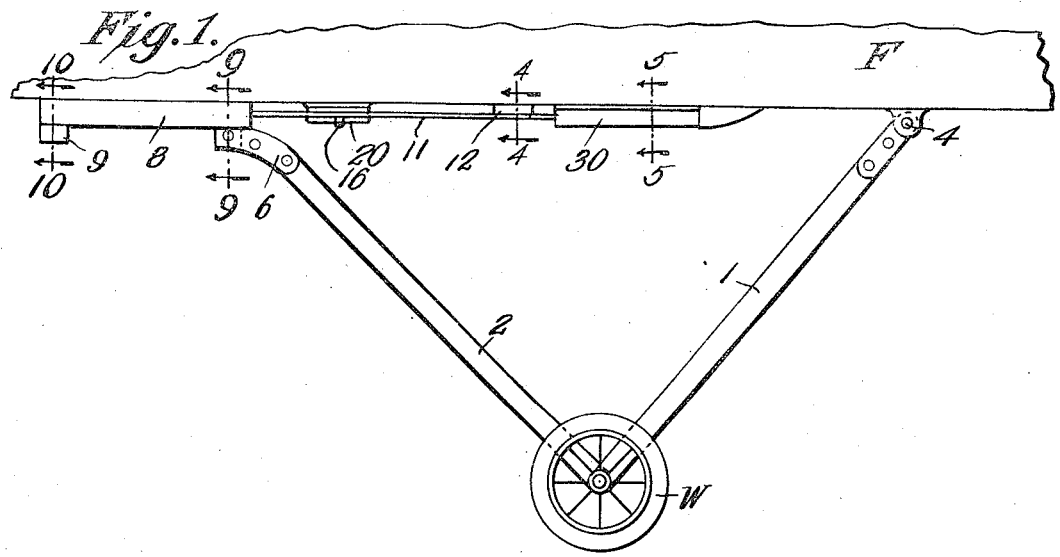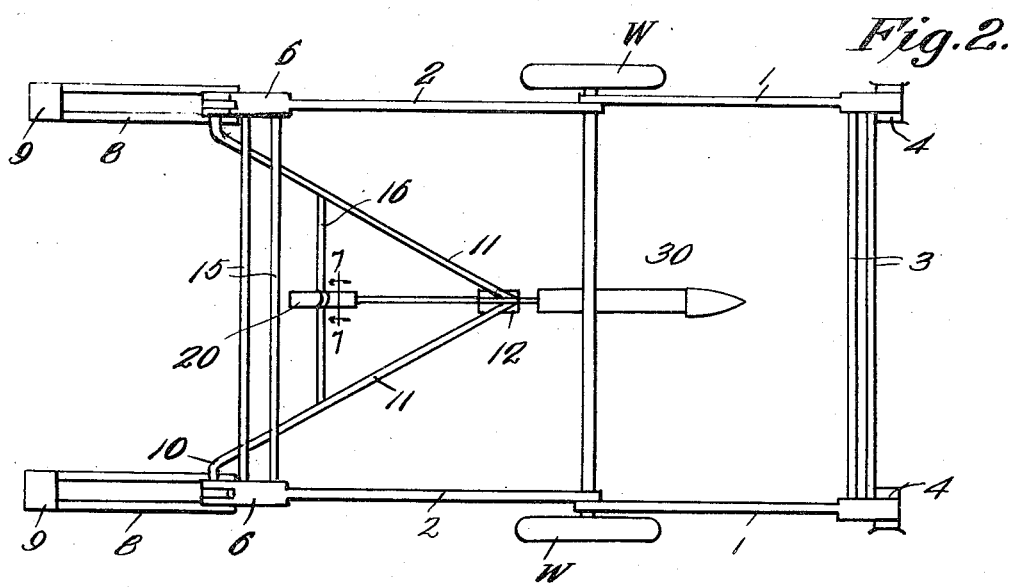

UNITED STATES PATENT OFFICE.

PETER ROSA, OF TONOPAH, NEVADA.

AEROPLANE SHOCK-ABSORBER.

1,277,260.                     Specification of Letters Patent.     Patented Aug. 27, 1918.

Application filed April 25, 1918. Serial No. 230,780.

*To all whom it may concern:*

Be it known that I, PETER ROSA, a citizen of the United States, residing at Tonopah, in the county of Nye and State of Nevada, have invented certain new and useful Improvements in Aeroplane Shock-Absorbers, of which the following is a specification.

This invention relates to aeronautics, and more especially to landing devices; and the object of the same is to produce an improved shock absorber for application to the supports for the landing wheels so as to cushion the blow or jar to or upon them when the machine lands rather heavily.

A further object is to provide means for automatically restoring the parts rather slowly to their normal position after the landing has been effected. Other objects will appear from the following specification and claims, and reference is made to the drawings herewith, wherein:—

Figure 1 is a side elevation of this device complete, and

Fig. 2 is a bottom plan view thereof,

Fig. 3 is a detail of the main or plunger rod and its T-support, and

Fig. 4 is an enlarged cross section on the line 4—4 of Fig. 1 showing the guides for said support, Fig. 5 is an enlarged cross section on the line 5—5 of Fig. 1, and Fig. 6 is a section on the line 6—6 of Fig. 5, these views showing the shock spring and its casing, Fig. 7 is an enlarged cross section on the line 7—7 of Fig. 2, and Fig. 8 is a section on the line 8—8 of Fig. 7, these views showing the dash pot details, Figs. 9 and 10 are enlarged sectional details on the lines 9—9 and 10—10 respectively of Fig. 1.

I have used the letter W to designate the usual wheels employed in landing, and F to designate a portion of the frame of the aeroplane beneath which these wheels are supported. In the present instance I mount them on the intermediate pivot rod of a truss composed of two pairs of links 1 and 2, the upper ends of the links 1 being connected by rungs 3 and pivoted at 4 beneath the frame F, and the upper ends of the links 2 being connected by rungs 5 and formed as shown at 6. Within the forks are pivotally mounted blocks 7 (see Fig. 9) which are preferably T-shaped as shown so that they may slide within guides 8 secured beneath the frame F and of appropriate formation. The outer ends of these guides are closed by stops 9 as shown in Fig. 10 to prevent excessive movement of the blocks, and the guides will be of proper length to give the wheels W a rise and fall commensurate with the work required of them.

The pivots between the blocks and forks above described are preferably the outturned extremities 10 of a large yoke 11 whose arms converge as best seen in Fig. 2 to the point 12 where they are united with the main or plunger rod 13. This closely underlies the frame F and is provided between its ends with a T-shaped support 14 (see Fig. 4) traveling in a guide 15 of appropriate shape, whereby the rod is maintained ever horizontal, whereas the links 1 and 2 will permit the wheels W to rise and fall as above described. The yoke 11 may have a brace 16 across it, but if so the brace must be deflected at its mid-length to pass beneath the cylinder of the dash pot next to be described.

Secured beneath the frame F at a proper point is a cylinder 20 within which reciprocates a plunger 21 which is fastened to one end of the rod 13. The body of this plunger has holes 22 in it, and carried by the rod adjacent the plunger is a flap-valve 23 serving, as seen in Fig. 8, to close said holes when the plunger moves to the right, but to permit them to open when the plunger moves to the left. The result is that when said cylinder is filled with an appropriate fluid, and it may be air or liquid, it offers little resistance to the inward movement of the plunger to the left but considerable resistance to the movement of the plunger and the rod 13 to the right. The purpose of this detail will be described below.

The other end of the rod 13 passes into the end of a casing 30 which is also secured beneath the frame F as seen in Fig. 5, and this casing contains the shock absorbing springs best illustrated in Fig. 6. This rod 13 extends the full length of the casing and is provided with a head 33 at its inner end. To this end of the casing at the point 34 is secured an eye which engages a hook 35 whose shank carries a knob 36. Attached to the shank of said hook behind the knob is one end of a main spring 37 which extends throughout the length of the casing and has its other end contracted adjacent a knob or button 38 on the rod 13. Secured also to the shank of the hook is one end of a secondary spring 39 whose body incloses about half the length of the rod 13 and whose inner end is reduced as shown. When now tension is applied to this rod tending to move it to the left, the button 38 immediately stretches the main spring 37, whereas the head 33 moves within the secondary spring 39 until it reaches the contracted end thereof, and then this spring also begins to stretch. Therefore this member affords a primary resistance to the movement of the rod 13 which is the result of the expansion of one spring, and an added or increased resistance as the rod moves farther, the same being the expansion of the other spring, in addition to the continued expansion of the first spring which now offers greater resistance because it is already under tension.

In the use of this device when applied beneath the frame work F of an aeroplane as suggested, when the machine reaches the ground we will assume that it strikes the same with considerable force and the wheels W are driven upward toward the frame. The immediate result is that the links 1 and 2 stretch out to a greater or less extent, the blocks 7 are moved to the left within the guides 8, the yoke 11 is drawn with the blocks, and this causes the movement of the entire rod 13. The right end of this rod puts tension on the main spring 37 and then on the auxiliary or secondary spring 38 in the manner just described, and meanwhile the left end of the rod moves the plunger 21 within the cylinder 20, constituting part of the dash pot. This end moves easily to the left as the springs are expanding, and the function of the dash pot is to permit the parts to be restored rather more slowly to the right when the springs are contracting to resume their normal position. However, it is quite within the spirit of my invention that the holes 22 through the plunger 21 might be made so small as to afford some degree of resistance when moving in either direction and in that event the dash pot gives a cushioning effect to the same. The use of this invention, therefore, affords a reliable shock absorber for preventing injury to an aeroplane which descends rather abruptly, and this is the primary object of my invention.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In a shock absorber of the type described, the combination with a truss composed of two pairs of links pivoted to each other and supporting wheels at such pivotal point, the outer ends of one pair of links being connected with the vehicle to be cushioned, blocks at the outer ends of the other pair of links, and guides in which said blocks travel; of a rod mounted in guides beneath said vehicle body, shock springs for resisting the movement of said rod, and connections between the latter and said blocks.

2. In a shock absorber of the type described, the combination with a truss composed of two pairs of links pivoted to each other and supporting wheels at such pivotal point, the outer ends of one pair of links being connected with the vehicle to be cushioned, blocks at the outer ends of the other pair of links, and guides in which said blocks travel; of a yoke connected with said blocks, a main rod connected with said yoke and shock-resisting springs connected with said rod and placed under tension when it is moved by the yoke.

3. In a shock absorber of the type described, the combination with a truss composed of two pairs of links pivoted to each other and supporting wheels at such pivotal point, the outer ends of one pair of links being connected with the vehicle to be cushioned, blocks at the outer ends of the other pair of links, and guides in which said blocks travel; of a rod movable horizontally beneath said vehicle body and connected with said blocks, shock springs connected with one end of said rod and put under tension when it is moved, and a dash pot whose plunger is connected with the other end of said rod, for the purpose set forth.

4. In a shock absorber of the type described, the combination with landing wheels movable upward under shock, guides on the vehicle, blocks movable horizontally therein, and connections between said wheels and blocks; of a yoke whose extremities are connected with said blocks, a main rod attached at its mid-length to the angle of said yoke, shock springs connected with one end of said rod, and a dash pot whose plunger is connected with the other end of the rod.

5. In a shock absorber of the type described, the combination with landing wheels movable upward under shock, guides on the vehicle, blocks movable horizontally therein, and connections between said wheels and blocks; of a guide adapted to be secured beneath the vehicle body, a main rod having a T-shaped support slidably mounted in this guide, connections between the mid-length of said rod and said yoke for moving the rod when the blocks move in said first-named guides, and a shock spring connected with said rod.

6. In a shock absorber of the type described, the combination with landing wheels movable upward under shock, guides on the vehicle, blocks movable horizontally therein, and connections between said wheels and blocks; of a guide adapted to be secured beneath the vehicle body, a main rod having a support slidably mounted in this guide, connections between the mid-length of said rod and said blocks for moving the rod when the blocks move in said first-named guides, a dash pot whose plunger is connected with one end of said rod, its cylinder being adapted to be attached to said vehicle, a spring casing adapted also to be attached to said vehicle, and within which the other end of said rod extends, and pick-up springs within said casing and adapted to be placed under tension as the rod is moved.

7. In a shock absorber of the type described, the combination with landing wheels movable vertically under shock, horizontal guides adapted to be attached to the vehicle, blocks movable therein, and connections between said wheels and blocks; of a yoke attached to said blocks, a rod attached to said yoke, guides in which said rod moves, a casing into which said rod extends, the rod having a head at its inner end within the casing, a small spring secured to the inner end of the casing and loosely inclosing said head and rod with its inner end reduced, and large spring secured to the end of the casing and loosely embracing said small spring and rod, extending beyond the reduced end of the small spring and having its end in turn reduced and attached to the rod, for the purpose set forth.

8. In a pick-up spring structure, the combination with a channeled casing having one end closed, a hook attached to said closed end, and a block carried by the hook; of a rod extending into the other end of the casing and having its inner end headed adjacent said block, large and small coiled springs respectively long and short inclosing the inner end of said rod and secured at one end to the shank of the hook behind its block, with their other ends reduced and surrounding said rod whereby the head of the latter engages the reduced end of the small spring when the rod has made its initial movement, and a button fast on the rod and engaging the reduced end of the large spring at the beginning of said initial movement.

In testimony whereof I affix my signature in presence of two witnesses.

PETER ROSA.

Witnesses:
  HARRY DUNSHEATH,
  PETER FARLIR.